(12) United States Patent
Noh et al.

(10) Patent No.: US 10,484,060 B2
(45) Date of Patent: Nov. 19, 2019

(54) METHOD AND DEVICE FOR TRANSMITTING AND RECEIVING CHANNEL STATE INFORMATION IN MOBILE COMMUNICATION SYSTEM

(71) Applicant: Samsung Electronics Co., Ltd., Gyeonggi-do (KR)

(72) Inventors: Hoon-Dong Noh, Gyeonggi-do (KR); Young-Woo Kwak, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/777,445

(22) PCT Filed: Nov. 16, 2016

(86) PCT No.: PCT/KR2016/013223
§ 371 (c)(1),
(2) Date: May 18, 2018

(87) PCT Pub. No.: WO2017/086698
PCT Pub. Date: May 26, 2017

(65) Prior Publication Data
US 2018/0375555 A1 Dec. 27, 2018

Related U.S. Application Data

(60) Provisional application No. 62/257,409, filed on Nov. 19, 2015, provisional application No. 62/256,895, (Continued)

(51) Int. Cl.
*H04B 7/0456* (2017.01)
*H04B 7/06* (2006.01)

(52) U.S. Cl.
CPC ......... *H04B 7/0478* (2013.01); *H04B 7/0639* (2013.01); *H04B 7/0645* (2013.01)

(58) Field of Classification Search
CPC ... H04B 7/0478; H04B 7/0639; H04B 7/0645
See application file for complete search history.

(56) References Cited

U.S. PATENT DOCUMENTS

2011/0085588 A1* 4/2011 Zhuang ............... H04B 7/0408
375/219
2014/0016549 A1 1/2014 Novlan et al.
(Continued)

FOREIGN PATENT DOCUMENTS

WO WO 2014178616 11/2014

OTHER PUBLICATIONS

PCT/ISA/210 Search Report issued on PCT/KR2016/013223 (pp. 5).
PCT/ISA/237 Written Opinion issued on PCT/KR2016/013223 (pp. 5).

*Primary Examiner* — Michelle M Koeth
(74) *Attorney, Agent, or Firm* — The Farrell Law Firm, P.C.

(57) ABSTRACT

A method and a device for transmitting channel state information in a mobile communication system are disclosed. The method includes the steps of: receiving signal information comprising information indicating a reporting mode for channel status information and information related to a codebook subset configuration for use in reporting the channel status information; determining whether to apply codebook subsampling to a master codebook based on the codebook subset configuration and the reporting mode; upon determining to apply the codebook subsampling to the master codebook, generating a subsampled codebook by subsampling the master codebook and generating the channel status information comprising a PMI generated based on the subsampled codebook; and transmitting the channel status information to a base station.

20 Claims, 11 Drawing Sheets

Related U.S. Application Data filed on Nov. 18, 2015, provisional application No. 62/256,738, filed on Nov. 18, 2015.

(56) References Cited

U.S. PATENT DOCUMENTS

| | | | |
|---|---|---|---|
| 2014/0198682 A1 | 7/2014 | Ko et al. | |
| 2014/0254701 A1 | 9/2014 | Geirhofer et al. | |
| 2014/0286452 A1 | 9/2014 | Gomadam et al. | |
| 2015/0280801 A1* | 10/2015 | Xin | H04B 7/0478 370/329 |
| 2015/0318909 A1* | 11/2015 | Zhang | H04B 7/0413 375/267 |
| 2016/0080064 A1* | 3/2016 | Kim | H04B 7/0456 370/281 |
| 2016/0100384 A1* | 4/2016 | Etemad | H04W 4/70 |
| 2018/0175992 A1* | 6/2018 | Froberg Olsson | H04L 5/0057 |
| 2018/0219598 A1* | 8/2018 | Kim | H04B 7/04 |

\* cited by examiner

| $i'_2$ | 0 | 1 | 2 | 3 |
|---|---|---|---|---|
| Precoder | $W^{(1)}_{s_1 i_{1,1}, s_2 i_{1,2}, 0}$ | $W^{(1)}_{s_1 i_{1,1}, s_2 i_{1,2}, 1}$ | $W^{(1)}_{s_1 i_{1,1}, s_2 i_{1,2}, 2}$ | $W^{(1)}_{s_1 i_{1,1}, s_2 i_{1,2}, 3}$ |
| $i'_2$ | 4 | 5 | 6 | 7 |
| Precoder | $W^{(1)}_{s_1 i_{1,1}+1, s_2 i_{1,2}, 0}$ | $W^{(1)}_{s_1 i_{1,1}+1, s_2 i_{1,2}, 1}$ | $W^{(1)}_{s_1 i_{1,1}+1, s_2 i_{1,2}, 2}$ | $W^{(1)}_{s_1 i_{1,1}+1, s_2 i_{1,2}, 3}$ |
| $i'_2$ | 8 | 9 | 10 | 11 |
| Precoder | $W^{(1)}_{s_1 i_{1,1}+2, s_2 i_{1,2}, 0}$ | $W^{(1)}_{s_1 i_{1,1}+2, s_2 i_{1,2}, 1}$ | $W^{(1)}_{s_1 i_{1,1}+2, s_2 i_{1,2}, 2}$ | $W^{(1)}_{s_1 i_{1,1}+2, s_2 i_{1,2}, 3}$ |
| $i'_2$ | 12 | 13 | 14 | 15 |
| Precoder | $W^{(1)}_{s_1 i_{1,1}+3, s_2 i_{1,2}, 0}$ | $W^{(1)}_{s_1 i_{1,1}+3, s_2 i_{1,2}, 1}$ | $W^{(1)}_{s_1 i_{1,1}+3, s_2 i_{1,2}, 2}$ | $W^{(1)}_{s_1 i_{1,1}+3, s_2 i_{1,2}, 3}$ |
| $i'_2$ | 16-31 | | | |
| Precoder | Entries 16-31 constructed with replacing the second subscript $s_2 i_{1,2}$ with $s_2 i_{1,2}+1$ in entries 0-15 | | | |

— 705

| Config | Selected $i'_2$ indices | $(s_1, s_2)$ |
|---|---|---|
| Config 1 | 0-3 | (1,1) |
| Config 2 | 0-7, 16-23 | (2,2) |
| Config 3 | 0-3, 8-11, 20-23, 28-31 | (2,2) |
| Config 4 | 0-15 | (2,2) |

710 — Config 1
715 — Config 2
720 — Config 3
725 — Config 4

| Oversampling factors $o_d$ | — 730 |
|---|---|
| Beam group spacing : $s_d$ | — 735 |
| First PMI : $i_{1,d}$ | — 740 |

FIG.7

Codebook for 2 layer CSI reporting gor Config 1

| $i_2$ | 0 | 1 | 2 | 3 |
|---|---|---|---|---|
| $i_{11}, i_{12}$ | $W^{(2)}_{i_{11}, i_{12}, 0}$ | $W^{(2)}_{i_{11}, i_{12}, 1}$ | $W^{(2)}_{i_{11}, i_{12}, 2}$ | $W^{(2)}_{i_{11}, i_{12}, 3}$ |

1205 ~ No subsampling for Config.1
→ All $i_2 \in \{0,1,2,3\}$ can be reported where $W^{(2)}_{m_1, m_2, n} = \dfrac{1}{2\sqrt{N_1 N_2}} \begin{bmatrix} v_{m_1} \otimes u_{m_2} & v_{m_1} \otimes u_{m_2} \\ \varphi_n v_{m_1} \otimes u_{m_2} & -\varphi_n v_{m_1} \otimes u_{m_2} \end{bmatrix}, \varphi_n = \exp\left(\dfrac{j2\pi n}{8}\right)$

FIG.12A

Codebook for 2 layer CSI reporting gor Config 2-4

| $i_2$ | 0 | 1 |
|---|---|---|
| $i_{11}, i_{12}$ | $W^{(2)}_{2i_{11}+f(0),2i_{12}+g(0),2i_{11}+f(0),2i_{12}+g(0),0}$ | $W^{(2)}_{2i_{11}+f(1),2i_{12}+g(1),2i_{11}+f(1),2i_{12}+g(1),0}$ |
| $i_2$ | 2 | 3 |
| $i_{11}, i_{12}$ | $W^{(2)}_{2i_{11}+f(2),2i_{12}+g(2),2i_{11}+f(2),2i_{12}+g(2),0}$ | $W^{(2)}_{2i_{11}+f(3),2i_{12}+g(3),2i_{11}+f(3),2i_{12}+g(3),0}$ |
| $i_2$ | 4 | 5 |
| $i_{11}, i_{12}$ | $W^{(2)}_{2i_{11}+f(0),2i_{12}+g(0),2i_{11}+f(1),2i_{12}+g(1),0}$ | $W^{(2)}_{2i_{11}+f(1),2i_{12}+g(1),2i_{11}+f(3),2i_{12}+g(3),0}$ |
| $i_2$ | 6 | 7 |
| $i_{11}, i_{12}$ | $W^{(2)}_{2i_{11}+f(2),2i_{12}+g(2),2i_{11}+f(3),2i_{12}+g(3),0}$ | $W^{(2)}_{2i_{11}+f(1),2i_{12}+g(1),2i_{11}+f(2),2i_{12}+g(2),0}$ |

Entries 8-15 constructed with replacing n=0 in the fifth subscript with n=1 in entries 0-7 where $W^{(2)}_{m_1,m_2,m_1,m_2,n} = \frac{1}{2\sqrt{N_1 N_2}} \begin{bmatrix} v_{m_1} \otimes u_{m_2} & v_{m_1} \otimes u_{m_2} \\ \varphi_n v_{m_1} \otimes u_{m_2} & -\varphi_n v_{m_1} \otimes u_{m_2} \end{bmatrix}$, $\varphi_n = \exp\left(\frac{j2\pi n}{8}\right)$, and $f(\ell), g(\ell) \forall \ell = 0,1,2,3$ 1210
No co-phasing term and subsampled beam quantization for config3 and config4
(same beam direction for both layers)
→ $i_2 \in \{0,1,2,3\}$ can be reported 1215
Co-phasing term and sparsely subsampled beam quantization for config2
(same beam direction for both layers)
→ $i_2 \in \{0,3,8,11\}$ can be reported $i_2 = 8$
$i_2 = 11$

FIG. 12B

Definition of function $f(\ell), g(\ell)$ for Config 2-4

| $\ell$ | Config 2 | | Config 3 | | Config 4 | |
|---|---|---|---|---|---|---|
| | $f(\ell)$ | $g(\ell)$ | $f(\ell)$ | $g(\ell)$ | $f(\ell)$ | $g(\ell)$ |
| 0 | 0 | 0 | 0 | 0 | 0 | 0 |
| 1 | 1 | 0 | 1 | 1 | 1 | 0 |
| 2 | 0 | 1 | 2 | 0 | 2 | 0 |
| 3 | 1 | 1 | 3 | 1 | 3 | 0 |

Codebook for 4 layer CSI reporting

| $i'_2$ | 0 | 1 | 2 | 3 |
|---|---|---|---|---|
| $i_{1,1}, i_{1,2}, k$ | $W^{(4)}_{s_1 i_{1,1}, s_1 i_{1,1} + \delta_1, s_2 i_{1,2}, s_2 i_{1,2} + \delta_{2,0}}$ | $W^{(4)}_{s_1 i_{1,1}, s_1 i_{1,1} + \delta_1, s_2 i_{1,2}, s_2 i_{1,2} + \delta_{2,1}}$ | $W^{(4)}_{s_1 i_{1,1} + p_1, s_1 i_{1,1} + p_1, s_2 i_{1,2}, s_2 i_{1,2} + \delta_{2,0}}$ | $W^{(4)}_{s_1 i_{1,1} + p_1, s_1 i_{1,1} + p_1, s_2 i_{1,2}, s_2 i_{1,2} + \delta_{2,1}}$ |
| $i'_2$ | 4 | 5 | 6 | 7 |
| $i_{1,1}, i_{1,2}, k$ | $W^{(4)}_{s_1 i_{1,1} + 2p_1, s_1 i_{1,1} + 2p_1, s_2 i_{1,2}, s_2 i_{1,2} + \delta_{2,0}}$ | $W^{(4)}_{s_1 i_{1,1} + 2p_1, s_1 i_{1,1} + 2p_1, s_2 i_{1,2}, s_2 i_{1,2} + \delta_{2,1}}$ | $W^{(4)}_{s_1 i_{1,1} + 3p_1, s_1 i_{1,1} + 3p_1, s_2 i_{1,2}, s_2 i_{1,2} + \delta_{2,0}}$ | $W^{(4)}_{s_1 i_{1,1} + 3p_1, s_1 i_{1,1} + 3p_1, s_2 i_{1,2}, s_2 i_{1,2} + \delta_{2,1}}$ |
| $i'_2$ | 8-15 | | | |
| $i_{1,1}, i_{1,2}, k$ | Entries 8-15 constructed with replacing $s_2 i_{1,2}$ in third and fourth subscript with $s_2 i_{1,2} + p_2$ in entries 0-7 | | | |

No subsampling for Config.1 → All $i'_2 \in \{0,1\}$ can be reported ~ 1405

Co-phasing term and sparsely subsampled beam quantization for config2 ~ 1410
→ $i'_2 \in \{0,1,6,7\}$ can be reported    [$i'_2 = 11$]    [$i'_2 = 10$]

No co-phasing term and subsampled beam quantization for config3 and config4 ~ 1415
→ $i'_2 \in \{0,2,4,6\}$ can be reported    [$i'_2 = 8$]
→ $i'_2 \in \{0,2,4,6\}$ can be reported

METHOD AND DEVICE FOR TRANSMITTING AND RECEIVING CHANNEL STATE INFORMATION IN MOBILE COMMUNICATION SYSTEM

PRIORITY

This application is a U.S. National Stage application of an International application No. PCT/KR2016/013223, which was filed on Nov. 16, 2016, and claims priority to U.S. Provisional applications Nos. 62/256,738, 62/256,895 and 62/257,409 filed with the U.S. Patent and Trademark Office on Nov. 18, 2015, Nov. 18, 2015, and Nov. 19, 2015, respectively, the entire disclosure of each of which is hereby incorporated by reference.

BACKGROUND

1. Field of the Disclosure

The present disclosure relates to methods and devices for transmitting and receiving channel state information (CSI) using codebooks in mobile communication systems.

2. Description of the Related Art

Current mobile communication systems are evolving to high-speed, high-quality wireless packet data communication systems to provide data services and multimedia services beyond the initial versions that have provided voice-centered services. To that end, various standardization organizations, such as the 3rd generation partnership project (3GPP), the 3GPP2, and the institute of electrical and electronics engineers (IEEE), are researching mobile communication system standards applying multicarrier-based multiple access schemes. Mobile communication standards, such as 3GPP long term evolution (LTE), 3GPP2 ultra mobile broadband (UMB), and IEEE 802.16m, have been developed to support high-rate and high-quality wireless packet data transmission services based on multicarrier-based multiple-access technologies.

Advanced mobile communication systems may take advantage of various techniques, such as multiple input multiple output (MIMO), beamforming, adaptive modulation and coding (AMC), and channel sensitive scheduling, to enhance transmission efficiency. The above-enumerated techniques enhance system capability by, e.g., concentrating transmit power coming from several antennas depending on channel quality, adjusting the amount of data transmitted, or selectively transmitting data to the user with a good channel quality to bring up with better transmission efficiency.

Such schemes mostly operate based on the channel status information between the base station (eNB: evolved Node B, BS: base station) and the terminal (UE: user equipment, MS: mobile station). Accordingly, the eNB or the UE is required to measure the channel status between the eNB and the UE. To that end, a channel status information reference signal (CSI-RS) is used. In advanced mobile communication systems, base station means a network entity that is typically stationary in a place to be responsible for downlink transmission and uplink reception. One base station may perform transmission and reception for a plurality of cells. In a mobile communication system, a plurality of base stations may geographically be scattered, and each base station may perform transmission and reception through a plurality of cells.

Among techniques available for enhancing spectral efficiency, energy efficiency, and processing complexity in LTE systems, full dimension multiple input multiple output (FD-MIMO) adopts a two-dimensional array of multiple antennas along the horizontal direction and vertical direction, raising beamforming accuracy and enhancing system performance.

Meanwhile, an increase in the number of antennas results in the width of a beam formed narrowing, thus leading to the need for using a larger codebook or various types of codebooks to report channel state information (CSI). For that reason, the precoding matrix indicator (PMI) for reporting channel status information may be enlarged or the precoding matrix that the PMI indicates may be interpreted in different meanings depending on contexts. Thus, a need exists for a new technology for setting the codebook used in precoding channel status information to efficiently transmit channel status information.

SUMMARY

According to the present disclosure, there are provided a method and device for transmitting and receiving channel status information on a mobile communication system.

According to the present disclosure, there are provided a method and device for transmitting and receiving channel status information to measure a wireless channel state (channel quality) and notify a base station of the measurement result by a terminal in a wireless mobile communication system adopting a multiple access scheme using multiple carriers such as orthogonal frequency division multiple access (OFDMA) and communicating the same.

According to the present disclosure, there are provided a method and device of performing codebook sub-sampling to efficiently report channel status information on an FD-MIMO system using multiple antennas.

According to an embodiment of the present disclosure, a method for transmitting channel status information in a mobile communication system comprises receiving a higher layer signaling message containing information indicating a reporting mode for the channel status information and information related to a codebook subset configuration for use in reporting the channel status information, determining whether to apply codebook subsampling to report a precoding matrix indicator (PMI) based on the codebook subset configuration and the reporting mode, upon determining to apply the codebook subsampling, generating a subsampled codebook by subsampling a given master codebook and generating the channel status information containing a PMI generated based on the subsampled codebook, and transmitting the channel status information to a base station.

According to an embodiment of the present disclosure, a method for receiving channel status information in a mobile communication system comprises transmitting a higher layer signaling message containing information indicating a reporting mode for the channel status information and information related to a codebook subset configuration for use in reporting the channel status information, receiving the channel status information containing a precoding matrix indicator (PMI) from a user equipment (UE), determining whether codebook subsampling has been applied for the PMI based on the reporting mode and the codebook subset configuration, and upon determining that the codebook subsampling has been applied, generating a subsampled codebook by subsampling a given master codebook and interpreting the PMI based on the subsampled codebook.

According to an embodiment of the present disclosure, a device in a user equipment (UE) for transmitting channel status information in a mobile communication system comprises a transceiver configured to receive a higher layer signaling message containing information indicating a reporting mode for the channel status information and information related to a codebook subset configuration for use in reporting the channel status information and a controller configured to determine whether to apply codebook subsampling to report a precoding matrix indicator (PMI) based on the codebook subset configuration and the reporting mode, upon determining to apply the codebook subsampling, generate a subsampled codebook by subsampling a given master codebook, generate the channel status information containing a PMI generated based on the subsampled codebook, and control the transceiver to transmit the channel status information to a base station.

According to an embodiment of the present disclosure, a device in a base station for receiving channel status information in a mobile communication system comprises a transceiver configured to transmit a higher layer signaling message containing information indicating a reporting mode for the channel status information and information related to a codebook subset configuration for use in reporting the channel status information and receive the channel status information containing a precoding matrix indicator (PMI) from a user equipment (UE) and a controller configured to determine whether codebook subsampling has been applied for the PMI based on the reporting mode and the codebook subset configuration, upon determining that the codebook subsampling has been applied, generate a subsampled codebook by subsampling a given master codebook, and interpret the PMI based on the subsampled codebook.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 illustrates an example of a codebook used to generate the PMI according to an embodiment of the present disclosure;

FIG. 12 illustrates an example of rank 2 codebook available in an FD-MIMO system according to an embodiment of the present disclosure;

FIG. 13 illustrates another example of rank 2 codebook available in the FD-MIMO system according to an embodiment of the present disclosure; and FIG. 14 illustrates another example of rank 4 codebook available in the FD-MIMO system according to an embodiment of the present disclosure.

It should be noted that the same or similar reference denotations may be used to refer to the same or similar elements, features, or structures throughout the drawings.

DETAILED DESCRIPTION OF THE DISCLOSURE

Figure 1:
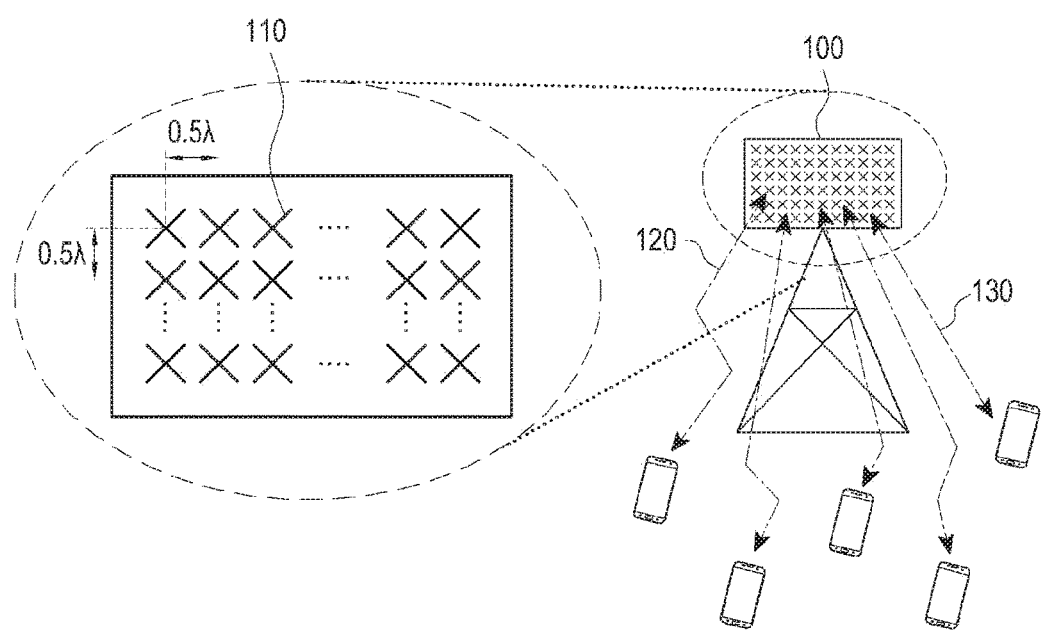
FIG. 1 illustrates a structure of an FD-MIMO system according to an embodiment of the present disclosure.

Hereinafter, embodiments of the present invention are described in detail with reference to the accompanying drawings.

In describing the embodiments, the description of technologies that are known in the art and are not directly related to the present invention is omitted. This is for further clarifying the gist of the present invention without making it unclear.

For the same reasons, some elements may be exaggerated or schematically shown. The size of each element does not necessarily reflect the real size of the element. The same reference numeral is used to refer to the same element throughout the drawings.

Advantages and features of the present invention, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present invention. The present invention is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card.

Although the description of embodiments herein focuses primarily on LTE-based wireless communication systems, the subject matter of the present disclosure may also be applicable to other communication systems or services having similar technical backgrounds without departing from the scope of the present disclosure, and this may be determined by one of ordinary skill in the art.

The LTE/LTE-A or other existing 3rd or 4th generation mobile communication systems utilize the MIMO technique in which transmission is performed using a plurality of transmission/reception antennas in order to increase system capability and data transmission rate. The MIMO technique makes use of a plurality of transmission/reception antennas to spatially separate and transmit a plurality of information streams. As such, the technique of spatially separating and transmitting a plurality of information streams is called spatial multiplexing. Generally, the number of information streams to which spatial multiplexing may be applied varies depending on the number of antennas of the transmitter and receiver. The number of information streams to which spatial multiplexing may be applied is called the rank of the corresponding transmission. The MIMO technique supported by the LTE/LTE-A release 11 and its predecessors supports spatial multiplexing for the case where there are eight transmit antennas and eight receive antennas and supports up to rank-8.

The FD-MIMO systems according to embodiments of the present disclosure, described below, may adopt eight or more, e.g., 32, transmit antennas, or more.

FIG. 1 illustrates a structure of an FD-MIMO system according to an embodiment of the present disclosure.

Referring to FIG. 1, the base station transmits wireless signals through an antenna array 100 constituted of eight or more transmit antennas 100. The transmit antennas 100 are spaced apart from each other to remain at a predetermined minimum distance therebetween. The minimum distance may be, e.g., a half of the wavelength of the wireless signal transmitted. Generally, where the transmit antennas 100 remain spaced at a distance which is a half of the wavelength of the wireless signal, the respective signals transmitted from the transmit antennas are influenced by radio channels that are mutually less correlated. Where the bandwidth of the wireless signals transmitted is 2 GHz, the distance becomes 7.5 cm, and this distance further reduces on a higher bandwidth than 2 GHz.

The eight or more transmit antennas 100 deployed in the transmission equipment of the base station are utilized to transmit wireless signals 120 and 130 to one or more user equipments (UEs). The wireless signals 120 and 130 transmitted through the plurality of transmit antennas 100 may be subject to proper precoding and may simultaneously be transmitted to the plurality of UEs. At this time, each UE may receive one or more information streams. The number of information streams that one UE may receive may be determined by the number of receive antennas that the UE has, and channel contexts.

In order to effectively implement the FD-MIMO system, the UE needs to exactly measure the channel status and interference magnitude and transmit effective channel status information to the base station using the results of the measurement. The channel status information may periodically or aperiodically be transmitted through the physical uplink control channel (PUCCH) or the physical uplink shared channel (PUSCH). The base station determines, e.g., what UEs downlink transmission is to be performed on, at what transmission rate, and what precoding is to be applied, using the channel status information.

Since the FD-MIMO system has many transmit antennas and takes only two-dimensional antenna arrays into consideration, a mere application of a method of communicating channel status information for LTE/LTE-A systems designed considering only, up to eight, one-dimensional array transmit antennas to the FD-MIMO system is not appropriate for the FD-MIMO systems, and may call for a transmission of additional control information to achieve the same performance as existing systems.

Figure 2:
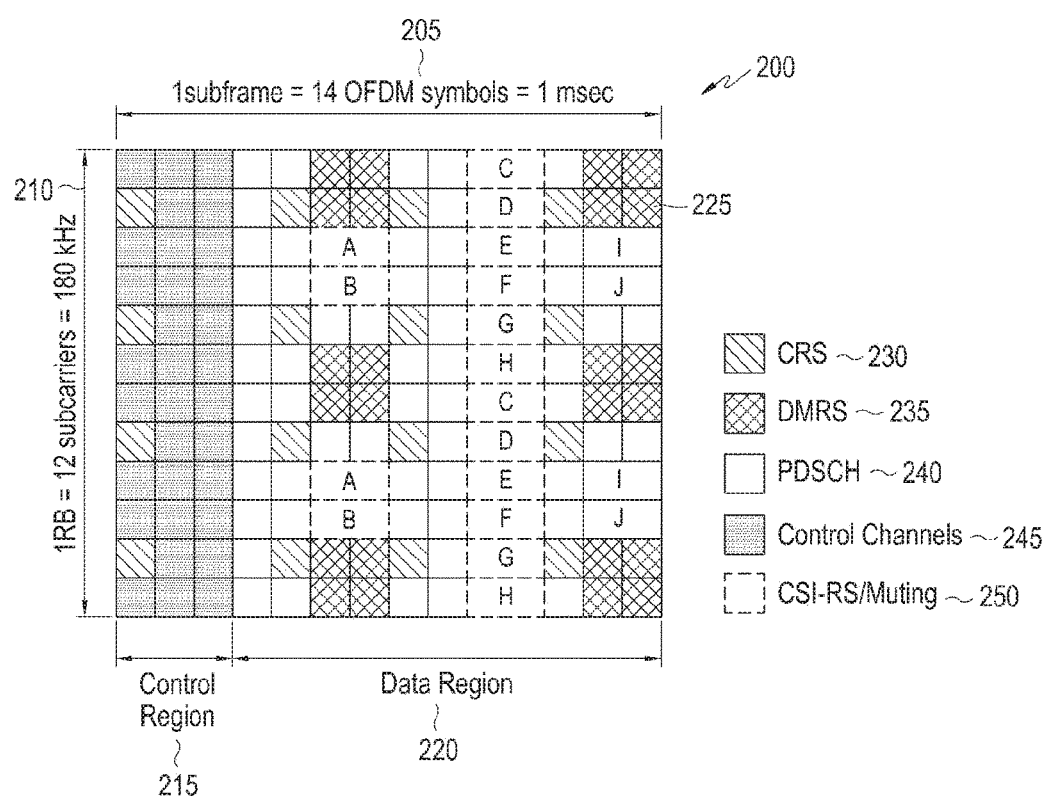
FIG. 2 is a view illustrating a downlink resource structure in an LTE/LTE-A system.

FIG. 2 is a view illustrating a downlink resource structure in an LTE/LTE-A system.

Referring to FIG. 2, the radio resource 200 of the minimum unit schedulable is constituted of one subframe 205 on the time axis and one resource block (RB) 210 on the frequency axis. The radio resource 200 takes up 12 subcarriers in the frequency domain and 14 OFDM symbols in the time domain and it thus has a total of 168 unique frequency and time positions. In this disclosure, each unique frequency and time position 225 is referred to as a resource element (RE).

The radio resource 200 may be divided into a control region 215 and a data region 220 on the time axis, and different types of signals as follow may be transmitted on the radio resource 200.

1. Cell specific RS (CRS) 230: a reference signal that is periodically transmitted for all the UEs belonging to one cell and that may be shared by a plurality of UEs.

2. Demodulation reference signal (DMRS) 235: a UE-specific reference signal transmitted for a particular UE. This signal is transmitted only when data is transmitted to the particular UE. A DMRS may be transmitted through a total of eight DMRS antenna ports (hereinafter, referred to as "DMRS ports"). Among the antenna ports available for LTE/LTE-A, port 7 to port 14 correspond to DMRS ports, and the ports maintain orthogonality using code division multiplexing (CDM) or frequency division multiplexing (FDM) not to interfere with each other.

3. Physical downlink shared channel (PDSCH) 240: a data channel transmitted on downlink, used for a base station to transmit traffic to a UE, and transmitted via REs where no reference signal is transmitted in the data region.

4. Channel status information reference signal (CSI-RS) 250: a reference signal transmitted for UEs belonging to one cell and used to measure the channel status. A plurality of CSI-RSs may be transmitted in one cell. One CSI-RS may correspond to one, two, four, or eight antenna ports hereinafter, referred to as CSI-RS ports). The positions of REs where the CSI-RS is transmitted in one radio resource 200 may be defined by a pattern (hereinafter, referred to as a CSI-RS pattern).

5. Other control channels 245 include the physical HARQ indicator channel (PHICH) used for the hybrid automatic repeat request (ARQ) (HARQ), the physical CFI channel (PCFICH) carrying the control format indicator (CFI), and the physical downlink control channel (PDCCH) carrying the downlink control information (DCI).

Besides the above signals, the LTE-A system may set a muting so that CSI-RS transmitted from another base station may be received by the UEs in the cell without interference. The muting may apply in the resource position (e.g., the RE) where the CSI-RS may be transmitted. Generally, the UE skips the resource position and receives traffic signals. The muting is also termed the zero-power CSI-RS. This is why the muting applies likewise to the resource positions of the CSI-RS and no transmit power is transmitted.

The CSI-RS 250 may be transmitted using some of the positions denoted with A, B, C, D, E, E, F, G, H, I, and J depending on the number of antennas transmitting the CSI-RS. The muting may also apply to some of the positions denoted with A, B, C, D, E, E, F, G, H, I, and J. In particular, the CSI-RS may be transmitted via two, four, or eight REs depending on the number of antenna ports used to transmit the CSI-RS. Where the number of antenna ports is two, the CSI-RS is transmitted using a half of a particular pattern in one radio resource 200, where the number of antenna ports is four, the CSI-RS is transmitted using the whole particular pattern, and where the number of antenna ports is eight, the CSI-RS is transmitted using two patterns. The muting is carried out always in each single pattern. That is, the muting, although applicable to a plurality of patterns, cannot apply to only part of one pattern unless it overlaps the position of the CSI-RS. However, only if the muting overlaps in position the CSI-RS, the muting may apply to only part of one pattern.

Upon requiring transmission of the CSI-RSs for two antenna ports, the respective CSI-RSs of the antenna ports are transmitted through two REs connected on the time axis, and the respective signals of the antenna ports are distinguished by orthogonal codes. Upon requiring transmission of the CSI-RSs for four antenna ports, the CSI-RSs for two antenna ports are transmitted, and the signals for the other two antenna ports are transmitted in the same manner using two additional REs. The same also applies where the CSI-RSs for eight antenna ports are transmitted.

In the 3GPP LTE-A system, the UE may measure the downlink channel status between the base station and the UE using the CRS or CSI-RS that the base station transmits. The channel status contains the amount of interference on the downlink. The downlink interference amount includes interference signals and thermal noise that are created by the antennas belonging to neighbor base stations and is critical for the UE to determine the channel status of the downlink. As an example, where a base station with one receive antenna transmits a signal to a UE with one receive antenna, the UE obtains the symbol energy, that it may receive on the downlink, and the amount of interference, that is to simultaneously be received in the period when the corresponding symbol is received and determines the interference energy-to-symbol energy Es/Io using the obtained values. The Es/Io is converted into a data transmission rate or its corresponding value and is fed back to the base station in a channel quality indicator (CQI). The base station may determine what UE it is to transmit to, at what data transmission rate, on the downlink based on the information fed back from the UEs.

In the LTE-A system, the UE feeds the downlink channel status information back to the base station, so that it may be utilized in the downlink scheduling of the base station. That is, the UE measures the reference signal transmitted from the base station on the downlink and feed-backs the information extracted through the measurement to the base station in a form as defined in the LTE-LTE-A standards. The information fed back from the UE in the LTE/LTE-A comes greatly in three times as follows.

Rank indicator (RI): the number of spatial layers that may be received by in the current channel status Precoder matrix indicator (PMI): an indicator for a precoding matrix favored by the UE in the current channel status.

Channel quality indicator (CQI): the maximum data rate at which the UE may perform reception in the current channel status. The CQI may be replaced with the signal-to-interference and noise ratio (SINR), the maximum error correction code rate and modulation scheme, or data efficiency per frequency which may be utilized similar to the maximum data rate.

The RI, PMI, and CQI are associated with one another and have meanings. As an example, the precoding matrix supported in LTE/LTE-A is defined to differ per rank. Accordingly, the PMI value when the RI is 1 and the PMI value when the RI is 2, even though the values are the same, are interpreted differently. Further, the UE assumes that, upon determining the CQI, the rank and PMI, of which the UE has notified the base station, have been applied to the base station's downlink transmission. That is, where the UE has notified the base station of RI_X, PMI_Y, and CQI_Z, it means that, when the rank is RI_X, and the precoding is PMI_Y, the UE may receive the data rate corresponding to CQI_Z. As such, the UE assumes what transmission scheme (including the rank and the PMI) is to be performed for the base station upon calculating the CQI, thereby allowing the optimized performance to be achieved upon actual transmission in the corresponding transmission scheme.

In LTE/LTE-A, the UE's periodic feedback may be set as one of four reporting modes (or feedback modes) as follows:

1. Reporting mode 1-0: RI and wideband CQI (wCQI) are reported.
2. Reporting mode 1-1: RI, wCQI, and PMI are reported.
3. Reporting mode 2-0: RI, wCQI, and subband CQI (sCQI) are reported.
4. Reporting mode 2-1: RI, wCQI, sCQI, and PMI are reported.

The feedback timings of the respective feedback entities for the reporting modes are determined by parameters, e.g., $N_{pd}$, $N_{OFFSET,CQI}$, $M_{RI}$, and $N_{OFFSET,RI}$, which are transmitted by higher layer signaling such as the radio resource control (RRC). In reporting mode 1-0, the transmission period of wCQI is $N_{pd}$ subframes, and the feedback timing begins at the offset of $N_{OFFSET,CQI}$. Further, the transmission period of RI is $N_{pd}*MRI$ subframes, and the offset indicating the start time of the feedback is $N_{OFFSET,CQI}+N_{OFFSET,RI}$.

Figure 3:
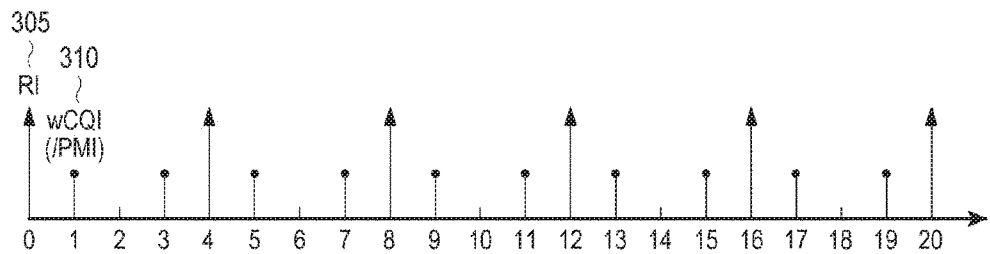
FIG. 3 is a view illustrating feedback timings of the rank indicator (RI) and the wideband channel quality indicator (wCQI) according to an embodiment of the present disclosure.

FIG. 3 is a view illustrating the feedback timing of the RI and the wCQI according to an embodiment of the present disclosure.

Referring to FIG. 3, $N_{pd}=2$, $M_{RI}=2$, $N_{OFFSET,CQI}=1$, $N_{OFFSET,RI}=-1$, and each timing is represented with the subframe index. The RI as shown is transmitted in the subframes #0,#4,#8, . . . , and the wCQI (and PMI) are transmitted in the subframes #1,#3,#5,#7, . . . .

Although reporting mode 1-1 has the same feedback timing as reporting mode 1-0, the wCQI and PMI may be together transmitted at the transmission timing of the wCQI in the circumstance of being one or two antenna ports or being some of the four antenna ports.

In reporting mode 2-0, the transmission period for the sCQI is $N_{pd}$ subframes, and the offset is $N_{OFFSET,CQI}$. The transmission period of the wCQI is $H*N_{pd}$ subframes, and the offset is $N_{OFFSET,CQI}$ as is the sCQI. Here, $H=J*K+1$, where K is a value transferred by higher layer signaling, and J is a value determined depending on the system bandwidth. For example, for 10 MHz systems, J is defined as 3. At last, the wCQI is transmitted instead of the sCQI, every H sCQI transmissions. The transmission period of the RI is $M_{RI}*H*N_{pd}$ subframes, and the offset is $N_{OFFSET,CQI}+N_{OFFSET,RI}$.

Figure 4:
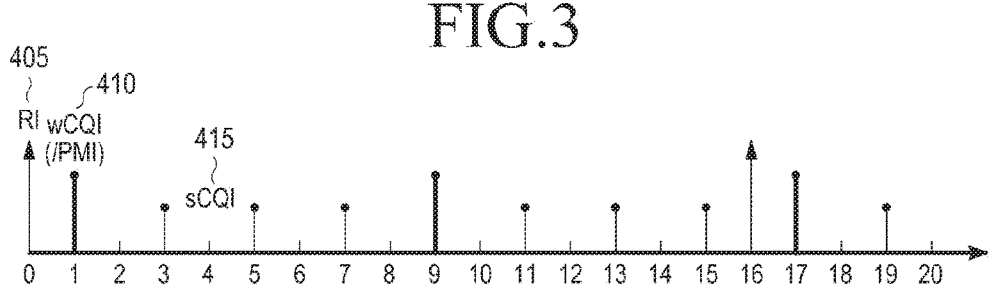
FIG. 4 is a view illustrating the feedback timings of the RI, the subband channel quality indicator (sCQI), and the wCQI according to an embodiment of the present disclosure.

FIG. 4 is a view illustrating the feedback timing of the RI, the sCQI, and the wCQI according to an embodiment of the present disclosure.

Referring to FIG. 4, $N_{pd}=2$. $M_{RI}=2$, J=3(10 MHz), K=1, $N_{OFFSET,CQI}=1$, $N_{OFFSET,RI}=-1$. As shown, the RI is transmitted in the subframes #0,#16, . . . and the wCQI (and PMI) are transmitted in the subframes #1,#9,#17, . . . , and the sCQI is transmitted in the subframes #3,#5,#7,#11,#13, #15, . . . .

Although reporting mode 2-1 has the same feedback timing as reporting mode 2-0, the wCQI and PMI may be together transmitted at the transmission timing of the wCQI in the circumstance of being one or two antenna ports or being some of the four antenna ports.

The feedback timings set forth above are related to some circumstances where the number of CSI-RS antenna ports is 1, 2, or 4. The UE configured for reporting the CSI-RS for four or eight CSI-RS antenna ports may feed back two types of PMIs depending on the settings of the higher layer signaling. The two types of PMIs are called the first PMI($i_1$) and the second PMI($i_2$).

Where the UE is configured for the reporting of the CSI-RS for four or eight CSI-RS antenna ports, reporting mode 1-1 may be set as one of two submodes by higher layer signaling. In the first submode, the RI together with the first PMI is transmitted, and the second PMI is transmitted along with the wCQI. Here, the feedback period and offset for the wCQI and the second PMI are defined as $N_{pd}$ and $N_{OFFSET,CQI}$, and the feedback period and offset for the RI and the first PMI, respectively, are defined as $M_{RI}*N_{pd}$ and $N_{OFFSET,CQI}+N_{OFFSET,RI}$.

If both the first PMI ($i_1$) and the second PMI ($i_2$) are reported from the UE to the base station, the UE and the base station identify that, in the codebook, which is a set of precoding matrixes shared by the UE and the base station, the precoding matrix W($i_1$, $i_2$), which corresponds to a combination of the first PMI and the second PMI is a precoding matrix favored by the UE. In another interpretation, if the precoding matrix corresponding to the first PMI is $W_1$ and the precoding matrix corresponding to the second PMI is $W_2$, then the base station determines that precoding matrix favored by the UE is the product, $W_1W_2$, of the two matrices.

When the reporting mode for eight CSI-RS antenna ports is 2-1, the precoding type indicator (PTI) is added to the reporting of the channel status information. At this time, the PTI is fed back along with the RI, the transmission period is $M_{RI}*H*N_{pd}$ subframes, and the offset is defined as $N_{OFFSET,CQI}+N_{OFFSET,RI}$.

Where the PTI is 0, the first PMI, the second PMI, and wCQI all are fed back. Here, the wCQI and the second PMI are together transmitted at the same timing, and the period and offset, respectively, are given as $N_{pd}$ and $N_{OFFSET,CQI}$. The period of the first PMI is $H'*N_{pd}$, and the offset is $N_{OFFSET,CQI}$. Here, H' is a value designated by higher layer signaling.

In contrast, where the PTI is 1, the wCQI is transmitted together with the wideband second PMI, and the sCQI along with the subband second PMI is transmitted at a separate timing. At this time, the first PMI is not transmitted, and the second PMI and CQI, which are calculated assuming the first PMI reported latest while the PTI is 0, are reported. The period and offset of the PTI and the RI are the same as when the PTI is 0. The period of sCQI is defined as $N_{pd}$ subframes, and the offset is defined as $N_{OFFSET,CQI}$. The wCQI and the second PMI are fed back with the period of $H*N_{pd}$ and the offset of $N_{OFFSET,CQI}$, and H is defined as where the number of CSI-RS antenna ports is two.

Figure 5:
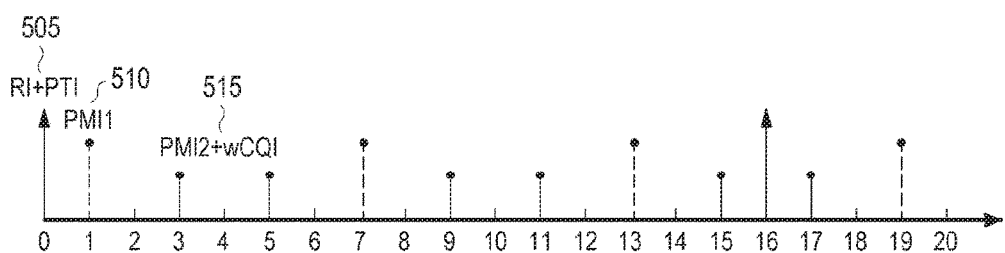
FIGS. 5 and 6 are views illustrating feedback timings of various feedback components according to an embodiment of the present disclosure.
Figure 6:
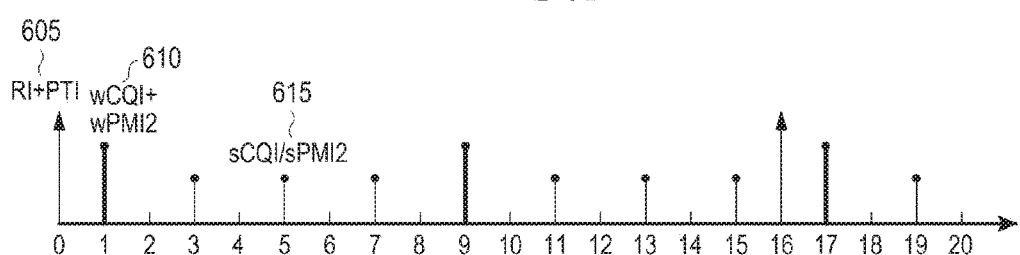

FIGS. 5 and 6 are views illustrating the feedback timing of the RI, PTI, PMI1/2, and the wCQI according to an embodiment of the present disclosure. Here, $N_{pd}=2$, $M_{RI}=2$, J=3(10 MHz), K=1, H'=3, $N_{OFFSET,CQI}=1$, $N_{OFFSET,RI}=-1$, and FIGS. 5 and 6, respectively, illustrate the feedback timings where PTI=0 and PTI=1.

Referring to FIG. 5, the RI and PTI are transmitted in the subframes #0,#16, . . . , the first PMI(PMI1) is transmitted in the subframes #1#7,#13, . . . , and the second PMI(PMI2) and wCQI are transmitted in the subframes #3,#5,#9,#11, #15,#17, . . . .

LTE/LTE-A supports aperiodic feedback as well as periodic feedback of the UE. When the base station desires to obtain aperiodic feedback information of the UE, the base station sets the aperiodic feedback indicator included in the downlink control information (DCI) for uplink data scheduling of the UE to perform a particular aperiodic feedback and performs the uplink data scheduling of the UE. The UE, when receiving the indicator set to perform an aperiodic feedback in an nth subframe, includes the aperiodic feedback information in the data transmission in an n+kth subframe and performs uplink transmission. Here, k is a parameter defined in the 3GPP LTE release 11 standards, and this is 4 for frequency division duplexing (FDD) and may be defined as shown in Table 1 for time division duplexing (TDD). That is, Table 1 below represents k corresponding to subframe number n.

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Where the aperiodic feedback is set, the feedback information includes at least one of the RI, PMI, and CQI like in the case of the periodic feedback, and the RI and the PMI might not be fed back according to the feedback settings. The CQI may include both the wCQI and the sCQI, or the wCQI alone.

LTE/LTE-A provides two codebook selection limitation functions considering various elements, such as feedback capacity and terminal complexity.

The first codebook selection restriction function is the bitmap-based codebook subset restriction (CSR). The CSR is supported in LTE/LTE-A transmission modes (TMs) 3, 4, 5, and 6 and TM 8, 9, and 10 reporting the PMI/RI. The size of the bitmap supported in each TM is as shown in Table 2. Table 2 below represents the number of bits in the codebook subset restriction bitmap for applicable transmission modes.

TABLE 2

| | Number of bits $A_c$ | | |
|---|---|---|---|
| | 2 antenna ports | 4 antenna ports | 8 antenna ports |
| Transmission mode 3 | 2 | 4 | |
| Transmission mode 4 | 6 | 64 | |
| Transmission mode 5 | 4 | 16 | |
| Transmission mode 6 | 4 | 16 | |
| Transmission mode 8 | 6 | 64 with alternativeCodeBookEnabledFor4TX-r12 = TRUE configured, otherwise 32 | |
| Transmission modes 9 and 10 | 6 | 96 with alternativeCodeBookEnabledFor4TX-r12 = TRUE configured, otherwise 64 | 109 |

As shown in Table 2, $A_c$ indicating the bitmap size is determined depending on the number of antenna ports or the transmission mode.

Each bitmap is configured as $a_{A_c-1}, \ldots, a_1, a_0$, where $a_0$ is the zero-th bit, i.e., the least significant bit (LSB), and $a_{A_c-1}$ is the $A_c$-1th bit, i.e., the most significant bit (MSB). The bits denoted by 0's in the bitmap mean that the precoder denoted by the PMI and RI is not used in generating channel information. The base station may restrict the codebook indexes that the UE may choose by notifying the UE of the bitmap through higher layer signaling.

As an example, when the base station sets eight antenna ports in TM 9 or 10, the bits of the bitmap may be mapped to PMI 1($i_1$) and PMI 2($i_2$) as follows.

Referring to Table 2, where eight antenna ports are set in TM9 or 10, $A_c=109$. The precoders that may be designated by v layers (v=1, 2, 3, 4, . . . or 8) and codebook index $i_1$ are designated for whether to be used by the (f1(-1)+$i_1$)th bit of the bitmap. At this time, f1(.)={0,16,32,36,40,44,48,52}. The precoders that may be designated by v layers (v=1, 2, 3, or 4) and codebook index $i_2$ are designated for whether to be used by the (53+g1(v−1)+$i_2$)th bit of the bitmap. At this time, g1(.)={0,16,32,48}.

The second codebook selection restriction function provided in LTE/LTE-A is codebook subsampling. The UE's periodic feedback is transmitted to the base station through the physical uplink control channel (PUCCH). Since the amount of information that may be transmitted once through the PUCCH is limited, feedback components, such as RI, wCQI, sCQI, PMI1, wPMI2, and sPMI2, may be shrunken by subsampling and may then be transmitted through the PUCCH, or two or more feedback components may be joint-encoded and may then be transmitted through the PUCCH.

As an example, where the number of CSI-RS ports set by the base station is eight, the RI and PMI1($i_1$) reported in submode 1 of reporting mode 1-1 through the PUCCH may be joint-encoded as shown in Table 3 below.

TABLE 3

| Value of joint encoding of RI and the first PMI ($I_{RI/PMI1}$) | RI | Codebook index ($i_1$) |
|---|---|---|
| 0-7 | 1 | 2 $I_{RI/PMI1}$ |
| 8-15 | 2 | 2($I_{RI/PMI1}$-8) |
| 16-17 | 3 | 2($I_{RI/PMI1}$-16) |
| 18-19 | 4 | 2($I_{RI/PMI1}$-18) |

TABLE 3-continued

| Value of joint encoding of RI and the first PMI ($I_{RI/PMI1}$) | RI | Codebook index ($i_1$) |
|---|---|---|
| 20-21 | 5 | 2($I_{RI/PMI1}$-20) |
| 22-23 | 6 | 2($I_{RI/PMI1}$-22) |
| 24-25 | 7 | 2($I_{RI/PMI1}$-24) |
| 26 | 8 | 0 |
| 27-31 | reserved | NA |

Based on Table 3, the RI constituted of three bits and the PMI1 constituted of four bits are joint-encoded into the $I_{RI/PMI1}$ which has a total of five bits.

As another example, where the number of CSI-RS ports set by the base station is eight, the second PMI($i_2$) reported in reporting mode 2-1 through the PUCCH may be subsampled as shown in Table 4 below.

TABLE 4

| | Relationship between the second PMI value and codebook index $i_2$ | |
|---|---|---|
| RI | Value of the second PMI $I_{PMI2}$ | Codebook index $i_2$ |
| 1 | 0-15 | $I_{PMI2}$ |
| 2 | 0-3 | 2 $I_{PMI2}$ |
| 3 | 0-3 | 8 · $\lfloor I_{PMI2}/2 \rfloor$ + ($I_{PMI2}$ mod 2) + 2 |
| 4 | 0-3 | $I_{PMI2}$ |
| 5 | 0 | 0 |
| 6 | 0 | 0 |
| 7 | 0 | 0 |
| 8 | 0 | 0 |

Based on Table 4, the PMI2 is reported as four-bit IPMI2 when its associated RI is 1. However, where the associated RI is two or more, the differential CQI for the second codeword should be reported together, and thus the PMI2 is subsampled into two-bit IPMI2. LTE/LTE-A may apply subsampling or joint encoding for a total of six types of periodic feedback including Tables 3 and 4.

As set forth above, the FD-MIMO system may use eight or more CSI-RS ports. In LTE/LTE-A, to estimate the channel status information between the base station and the UE, one or more, i.e., 2, 4, or 8 CSI-RS patterns may be configured for the terminal, and the UE may combine the configured CSI-RS patterns to allow the CSI-RSs to be received through eight or more CSI-RS ports. As an example, CSI-RS resources constituted of 12 or 16 CSI-RS ports may be configured for the UE. The UE may generate the PMI based on the channel information estimated based on the CSI-RSs received through the 12 or 16 CSI-RS ports.

FIG. 7 illustrates an example of a codebook used to generate the PMI according to an embodiment of the present disclosure. The UE may generate the PMI based on the codebook shown.

Referring to FIG. 7, $N_1$ and $N_2$ are the numbers of the antenna ports for the first direction and the second direction, and the following setting may be made: $(N_1, N_2) \in \{(8,1), (2,2), (2,3), (3,2), (2,4), (4,2)\}$. $o_1$ and $o_2$ (730) are oversampling factors for the first direction and the second direction, and $o_1, o_2 \in \{2,4,8\}$. The master codebook 705 determined by $N_1$, $N_2$, $o_1$, and $o_2$ has a total of 32 indexes $i'_2$. The UE determines one subset of the master codebook 705 as a codebook to actually be used to report the channel status information by the codebook subset configuration of the higher layer signaling.

The precoding matrix $W_{m_1,m_2,n}^{(1)}$ corresponding to codebook index $i'_2$ is constituted of the components $v_{m_1}$, $u_{m_2}$, $\varphi_n v_{m_1}$, and $u_{m_2}$ determined based on the beam group spacing $s_d$ (735), the first and second PMIs ($i_{1,1}$, $i_{1,2}$) (740), and the oversampling factor $o_d$(730). In the equation shown, Q is a value determined depending on the number of layers used in reporting channel status information.

In the example shown, each precoding matrix may be defied as shown in Equation 1 below.

$$W_{m_1,m_2,n}^{(1)} = \frac{1}{\sqrt{Q}} \begin{bmatrix} v_{m_1} \otimes u_{m_2} \\ \varphi_n v_{m_1} \otimes u_{m_2} \end{bmatrix}$$ [Equation 1]

$$v_{m_1} = \begin{bmatrix} 1 & e^{j\frac{2\pi m_1}{o_1 N_1}} & \cdots & e^{j\frac{2\pi m_1 (N_1-1)}{o_1 N_1}} \end{bmatrix}^t$$

$$u_{m_2} = \begin{bmatrix} 1 & e^{j\frac{2\pi m_2}{o_2 N_2}} & \cdots & e^{j\frac{2\pi m_2 (N_2-1)}{o_2 N_2}} \end{bmatrix}^t$$

$$\varphi_n = e^{j\pi n/2}$$

As an example, where the higher layer signaling configures config 1(710), the beam group selected by the second PMIs ($i_{1,1}$, $i_{1,2}$) includes only one beam direction. At this time, the second PMI $i_2$ is constituted of two bits and indicates information about the co-phasing term. As an example, where the higher layer signaling configures config 2(715), the beam group selected by ($i_{1,1}$, $i_{1,2}$) includes only four beam directions, and at this time, $i_2$ is information about the one-bit co-phasing term. As shown above in the two examples, although N1, N2, o1, and o2 are set to be the same, the payload of $i_2$ or $i'_2$ of the master codebook 705 indicated by the reported $i_2$ may be varied depending on the codebook subset configuration 710, 715, 720, and 725 corresponding to the codebook beam group configuration. Accordingly, when the channel status information reporting (e.g., PUCCH reporting mode 2-1) to permit two or more feedback components to be multiple-transmitted at one feedback timing is configured for the UE, it may be difficult to apply a single subsampling rule to the master codebook by one (N1, N2, o1, o2) combination as shown in Table 4.

As set forth above, in the FD-MIMO system supporting eight or more CSI-RS ports, the codebook index $i_2$ which has various payloads or various meanings based on codebook subset configurations may be used. Accordingly, it may be inefficient to perform channel information reporting on two or more feedback components by applying the same subsampling rule to each codebook subset configuration.

In various embodiments of the present disclosure described below, there are provided codebook subsampling schemes for feedback components given the codebook characteristics of the FD-MIMO system. The above-described codebook subsampling may be used to generate a subsampled codebook to define, e.g., the second PMI.

In an embodiment of the present disclosure, the base station and the UE may perform codebook subsampling for PMI reporting by assuming a particular codebook subset regardless of the codebook subset configuration information determined by higher layer signaling, such as the RRC message, or configured codebook subset.

By Table 4, the LTE/LTE-A system may transmit up to 4-bit $i_2$ along with other feedback components in the case of rank 1. Meanwhile, based on the codebook subset configurations 710, 715, 720, and 725 of FIG. 7, since the payload required for $i_2$ of rank 1 codebook in the FD-MIMO system is up to a maximum of four bits, $i_2$ may be reported along with other feedback components without subsampling in the case of rank 1.

By Table 4, the LTE/LTE-A system may transmit up to 2-bit $i_2$ along with other feedback components in the case of rank 2 or up. Meanwhile, based on the codebook subset configurations 710, 715, 720, and 725 of FIG. 7, since payload required for $i_2$ of rank 2 codebook in the FD-MIMO system is up to a maximum of four bits, subsampling may be needed to report $i_2$ along with other feedback components in the case of rank 1 or up.

In an embodiment of the present disclosure, subsampling may be indicated by the codebook subset configuration made by higher layer signaling. As an example, where at least two feedback components are permitted for multiple-transmission at one feedback timing as in reporting mode 2-1, the UE may apply different subsampling rules based on the codebook subset configuration to report $i_2$. As an example, where a plurality of feedback components are permitted for simultaneous transmission, the UE generates the PMI($i_{1,1}$, $i_{1,2}$, $i_2$) by assuming a particular codebook subset configuration that does not require subsampling for reporting $i_2$ and may neglect the codebook subset configuration made by the higher layer signaling.

Figure 8:
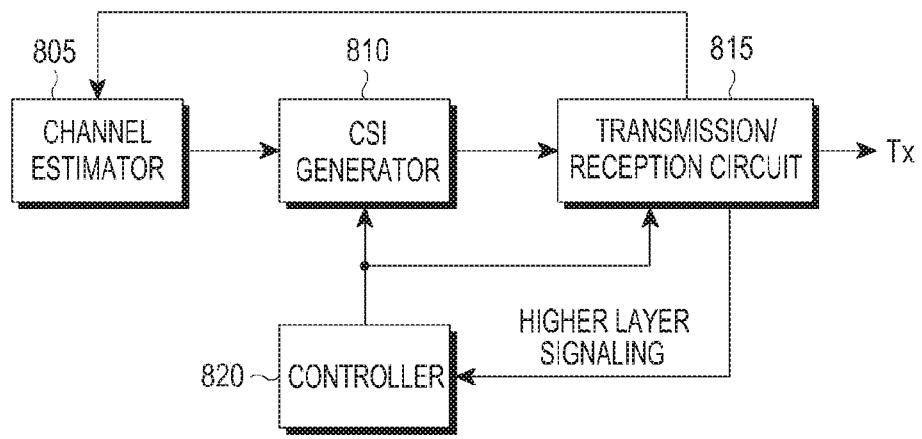
FIG. 8 is a block diagram schematically illustrating a structure of a UE to report channel status information according to an embodiment of the present disclosure.

FIG. 8 is a block diagram schematically illustrating a structure of a UE to report channel status information according to an embodiment of the present disclosure.

Referring to FIG. 8, a channel estimator 805 receives reference signals, e.g., CSI-RSs, from the serving cell or other cells and estimates the channel information. A channel status information generator 810 generates at least one feedback component among the RI, PMI, and CQI, based on the channel status information reporting configuration and reporting mode indicated by the base station and based on the channel information input from the channel estimator 805. Here, where the reporting mode indicated by the base station permits the CQI to be transmitted along with the PMI at one feedback timing, the channel status information generator 810 may subsample the master codebook using the subsampling rule determined by the codebook subset configuration given from the base station and generate the PMI using the subsampled codebook. The PMI generated using the subsampled codebook has a reduced payload size as compared with using the master codebook.

A transmission/reception circuit 815 processes (channel coding, modulation, or OFDM transform) at least one feedback component provided from the channel status information generator 810 at the feedback timing controlled by a controller 820 and transmits it through a given resource region (e.g., the PUCCH or PUSCH).

The controller 820 may receive a higher layer signaling from the base station, obtain configuration information related to reporting channel status information contained in the higher layer signaling, and control the operation of the channel status information generator 810 and a transmission circuit 815 according to the obtained information. Specifically, the controller 820 obtains a higher layer signaling message containing parameters related to the transmission timings and reporting mode of the feedback components through the transmission/reception circuit 815, determine the transmission timing for the feedback components, or the controller 820 obtains parameters related to the codebook subset configuration through the higher layer signaling and controls the generation of the RI, PMI, and CQI by the channel status information generator 810.

Although the channel status information generator 810 and the controller 820 are illustrated separately herein, the controller 820 may be configured to include the functions of the channel status information generator 810 according to implementations.

Figure 9:
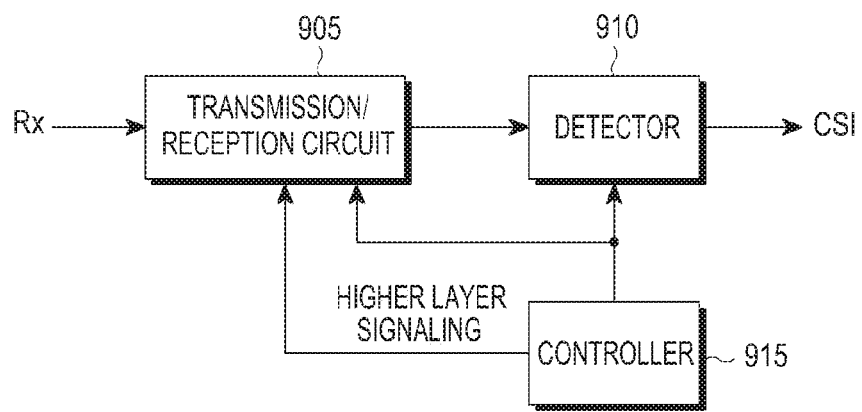
FIG. 9 is a block diagram schematically illustrating a structure of a base station to control the reporting of channel status information according to an embodiment of the present disclosure.

FIG. 9 is a block diagram schematically illustrating a structure of a base station to control the reporting of channel status information according to an embodiment of the present disclosure.

Referring to FIG. 9, a controller 915 determines parameters related to reporting channel status information for the UE in the cell and provides a higher layer signaling message containing the determined parameters to the UE through a transmission/reception circuit 905. The higher layer signaling may include, e.g., parameters related to the transmission timing and reporting mode of feedback components and parameters related to the codebook subset configuration.

The transmission/reception circuit 905 receives the wireless signal from the UE, and a detector 910 detects from the wireless signal, and interprets, the feedback components of the channel status information transmitted by the UE. The feedback components are interpreted by referring to the parameter provided to the UE by the controller 915.

Although the controller 915 and the detector 910 are illustrated separately herein, the controller 915 may be configured to include the functions of the detector 910 according to implementations.

Figures 10, 11:
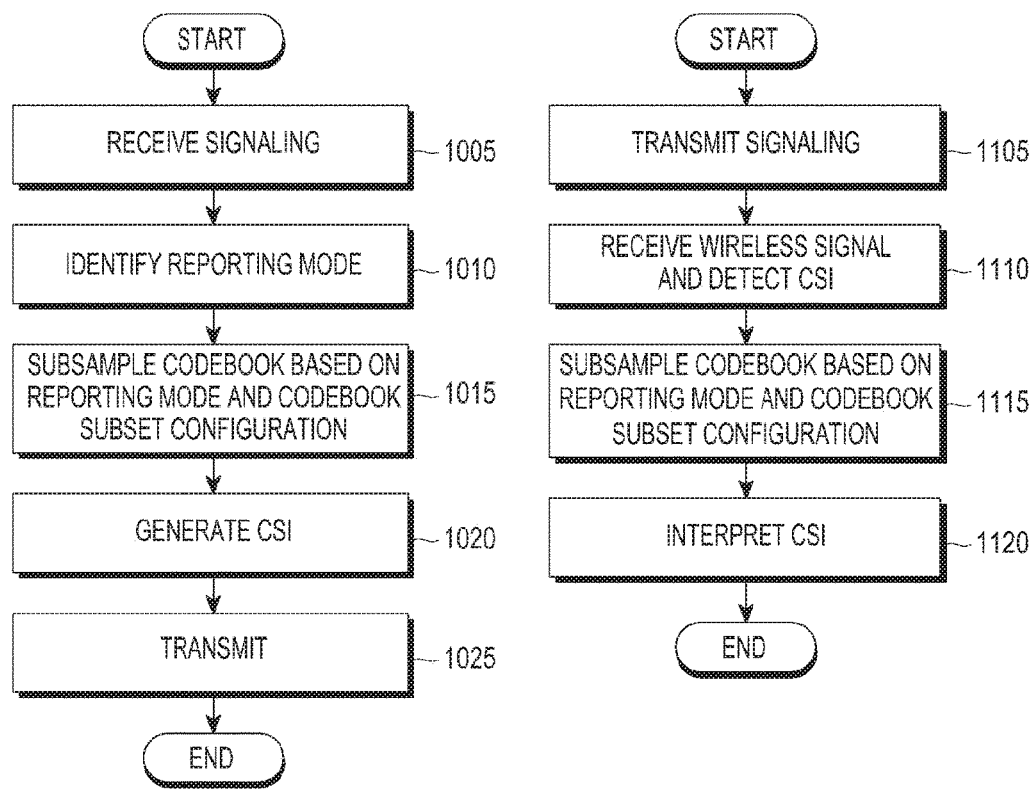
FIG. 10 is a flowchart illustrating a procedure of a UE to report channel status information according to an embodiment of the present disclosure.
FIG. 11 is a flowchart illustrating a procedure of a base station to control the reporting of channel status information according to an embodiment of the present disclosure.

FIG. 10 is a flowchart illustrating a procedure of a UE to report channel status information according to an embodiment of the present disclosure.

Referring to FIG. 10, in step 1005, the UE receives a higher layer signaling and obtains, from the higher layer signaling, parameters related to the transmission timings and reporting mode of feedback components and parameters related to the codebook subset configuration. In step 1010, the UE identifies the reporting mode configured for the UE by the base station through the higher layer signaling. In particular, the UE identifies the feedback components that should be reported through the identified reporting mode and determines whether two or more feedback components may simultaneously be transmitted.

In step 1015, the UE performs codebook subsampling when it is determined to be necessary based on the codebook subset configuration and the reporting mode. In step 1020, the UE generates channel status information containing at least one feedback component to be transmitted at the feedback timing. At this time, where the PMI should be transmitted together with other feedback components at the feedback timing, the subsampled codebook which has been generated through the codebook subsampling is used to generate the PMI.

In step 1025, the UE transmits the generated channel status information through a given resource region to the base station.

FIG. 11 is a flowchart illustrating a procedure of a base station to control the reporting of channel status information according to an embodiment of the present disclosure.

Referring to FIG. 11, in step 1105, the base station determines parameters related to reporting channel status information for the UE in the cell and provides the determined parameters through a higher layer signaling to the UE. The higher layer signaling may include, e.g., parameters related to the transmission timings and reporting mode of feedback components and parameters related to the codebook subset configuration.

In step 1110, the base station receives a wireless signal containing the channel status information transmitted by the higher layer signaling from the UE. In step 1115, the base station performs codebook subsampling for the UE based on the codebook subset configuration and the reporting mode configured for the UE by the higher layer signaling and obtains the subsampled codebook. In step 1120, the base station may use the subsampled codebook to interpret the channel status information, particularly PMI, obtained from the wireless signal.

Below are described specific embodiments to perform codebook subsampling based on the reporting mode and the codebook subset configuration.

Since, for class A codebook configuration 1 given by higher layer signaling, the maximum payload for $i_2$ is two bits, no codebook subsampling is applied for the PMI multiple-transmitted.

Since, for class A codebook configuration 2 given by higher layer signaling, the angular spread is small in the environment, the subsampling of the sparse beam domain applies.

Since, for class A codebook configuration 3 given by higher layer signaling, the antenna array aperture is enough in the environment, subsampling applies in the beam domain without co-phasing.

Since, for class A codebook configuration 4 given by higher layer signaling, the antenna array aperture is enough in the environment, subsampling applies in the beam domain without co-phasing.

In the following embodiments, the codebook subsampling rule may be varied depending on the codebook subset configuration.

By Table 4, where the reporting mode permitting the multiple transmission of PMI is rank 2 or up, the payload for reporting $i_2$ may support up to two bits. Accordingly, where the FD-MIMO system uses three bits or more of $i_2$ in rank 2 or up, a subsampling rule for the reporting mode is defined.

FIGS. 12a to 12c illustrate examples of rank 2 codebooks available in the FD-MIMO system according to an embodiment of the present disclosure. Here, codebooks for 2-layer CSI reporting are shown for the respective codebook subset configurations.

Referring to FIG. 12a, where in the rank 2 codebook the codebook subset configuration made by higher layer signaling indicates config 1 (1205), no codebook subsampling applies, and two-bit $i_2$ is used. That is, $i_2$ selected from among $\{0,1,2,3\}$ may be reported through the reporting mode without subsampling.

Referring to FIGS. 12b and 12c, since four-bit $i_2$ is required where the rank is 2 and the codebook subset configuration is config 2 (1210), codebook subsampling is applied to reduce the payload size necessary for reporting $i_2$ to two bits. Since the codebook subset configuration config 2 forms a beam group of four vertical and horizontal beams that are positioned adjacent each other (715 of FIG. 7), it is appropriate when the channel angular spread is relatively small. In this case, rank 2 is highly likely to be secured by polarization terms rather than channel direction terms. Accordingly, upon performing codebook subsampling for $i_2$, it is needed to maintain all of the co-phasing terms and channel direction terms. In the example shown, the codebook subsampling rule for codebook subset configuration config 2 is defined to select one from $i_2 \in \{0,3,8,11\}$. This is intended to quantize the co-phasing terms through $\{i_2=0$ vs $i_2=8\}$ or $\{i_2=3$ vs $i_2=11\}$ and to quantize the channel direction terms through $\{i_2=0$ vs $i_2=3\}$ or $\{i_2=8$ vs $i_2=11\}$. As another example, where the channel directions to be representative differ from each other, the codebook subsampling rule may be defined to select one from $i_2 \in \{0,1,8,9\}$.

Since four-bit $i_2$ is required where the rank is 2 and the codebook subset configuration is config 3 (1210), codebook subsampling is applied to reduce the payload size necessary for reporting $i_2$ to two bits. Since the codebook subset configuration config 3 forms a beam group of four vertical and horizontal beams that are not positioned adjacent each other (720 of FIG. 7), it is appropriate when the channel angular spread is relatively large. In this case, rank 2 is highly likely to be secured by the direction terms rather than channel polarization terms. Accordingly, it is material to maintain the channel direction terms upon performing codebook subsampling for $i_2$. In the example shown, the codebook subsampling rule for codebook subset configuration config 3 is defined to select one from $i_2 \in \{0,1,2,3\}$. This is intended to quantize only the channel direction terms while omitting the co-phasing terms from $i_2$. As another example, where the channel directions to be representative differ from each other, the codebook subsampling rule may be defined to select one from $i_2 \in \{0,2,4,6\}$.

Since four-bit $i_2$ is required where the rank is 2 and the codebook subset configuration is config 4 (1210), codebook subsampling is applied to reduce the payload size necessary for reporting $i_2$ to two bits. Since the codebook subset configuration config 4 forms a beam group of four beams having the second direction term fixed (725 of FIG. 7), it is appropriate when the disparity in angular spread between the first direction and the second direction is relatively large. In this case, rank 2 is highly likely to be secured by the direction terms rather than channel polarization terms. Accordingly, it is material to maintain the channel direction terms upon performing codebook subsampling for $i_2$. In the example shown, the codebook subsampling rule for codebook subset configuration config 4 is defined to select one from $i_2 \in \{0,1,2,3\}$. This is intended to quantize only the channel direction information while omitting the co-phasing terms from $i_2$. As another example, where the channel directions to be representative differ from each other, the codebook subsampling rule may be defined to select one from $i_2 \in \{0,2,4,6\}$.

Figure 13:
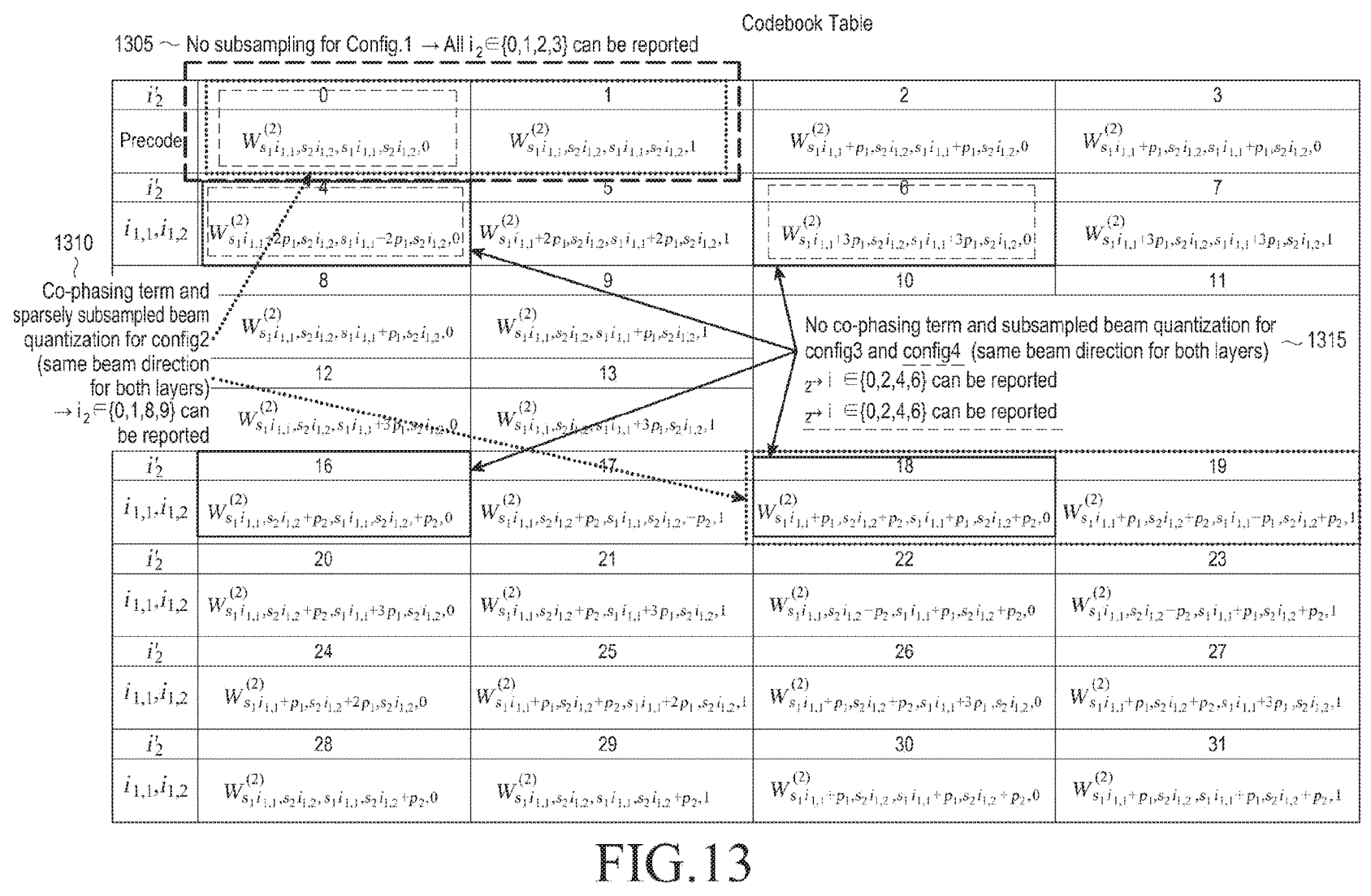

FIG. 13 illustrates another example of rank 2 codebook available in the FD-MIMO system according to an embodiment of the present disclosure. A codebook table is exemplified herein which may be used for 2-layer CSI reporting.

Referring to FIG. 13, where in the rank 2 codebook the codebook subset configuration made by higher layer signaling indicates config 1 (1305), one-bit $i_2$ is required, and where the codebook subset configuration indicates config 2, config 3, or config 4 (1310,1315), four-bit $i_2$ is required.

Where the rank is 2, and the codebook subset configuration is config 1 (1305), $i_2 \in \{0,1\}$ may be reported through the reporting mode but without codebook subsampling.

Since four-bit $i_2$ is required where the rank is 2 and the codebook subset configuration is config 2 (1310), codebook subsampling is applied to reduce the payload size necessary for reporting $i_2$ to two bits. Since the codebook subset configuration config 2 forms a beam group of four vertical and horizontal beams that are positioned adjacent each other (715 of FIG. 7), it is appropriate when the channel angular spread is relatively small. In this case, rank 2 is highly likely to be secured by the polarization terms rather than channel direction terms. Accordingly, upon performing codebook subsampling for $i_2$, it is needed to maintain all of the co-phasing terms and channel direction terms. In the example shown, the codebook subsampling rule for codebook subset configuration config 2 is defined to select one from $i_2 \in \{0,1,8,9\}$. This is intended to quantize the co-phasing terms through $\{i_2=0$ vs $i_2=1\}$ or $\{i_2=8$ vs $i_2=9\}$ and to quantize the channel direction terms through $\{i_2=0$ vs $i_2=8\}$ or $\{i_2=1$ vs $i_2=9\}$. As another example, where the channel directions to be representative differ from each other, the codebook subsampling rule may be defined to select one from $i_2 \in \{0,3,8,10\}$ or $i_2 \in \{0,4,8,11\}$.

Since four-bit $i_2$ is required where the rank is 2 and the codebook subset configuration is config 3 (1315), codebook subsampling is applied to reduce the payload size necessary for reporting $i_2$ to two bits. Since the codebook subset configuration config 3 forms a beam group of four vertical and horizontal beams that are not positioned adjacent each other (720 of FIG. 7), it is appropriate when the channel angular spread is relatively large. In this case, rank 2 is highly likely to be secured by the direction terms rather than channel polarization terms. Accordingly, it is material to maintain the channel direction terms upon performing codebook subsampling for $i_2$. In the example shown, the codebook subsampling rule for codebook subset configuration config 3 is defined to select one from $i_2 \in \{0,2,4,6\}$. With respect to the master codebook, the codebook subsampling rule corresponds to $i'_2 \in \{1,6,16,18\}$. This is intended to quantize only the channel direction terms while omitting the co-phasing terms from $i_2$. As another example, where the channel directions to be representative differ from each other, the codebook subsampling rule may be defined to select one from $i_2 \in \{0,4,8,10\}$.

Since four-bit $i_2$ is required where the rank is 2 and the codebook subset configuration is config 4 (1315), codebook subsampling is applied to reduce the payload size necessary for reporting $i_2$ to two bits. Since the codebook subset configuration config 4 forms a beam group of four beams having the second direction term fixed (725 of FIG. 7), it is appropriate when the disparity in angular spread between the first direction and the second direction is relatively large. In this case, rank 2 is highly likely to be secured by the direction terms rather than channel polarization terms. Accordingly, it is material to maintain the channel direction terms upon performing codebook subsampling for $i_2$. In the example shown, the codebook subsampling rule for codebook subset configuration config 4 is defined to select one from $i_2 \in \{0,2,4,6\}$. With respect to the master codebook, the codebook subsampling rule corresponds to $i'_2 \in \{0,2,4,6\}$. This is intended to quantize only the channel direction terms while omitting the co-phasing terms from $i_2$.

FIG. 14 illustrates another example of rank 4 codebook available in the FD-MIMO system according to an embodiment of the present disclosure. A codebook for 4-layer CSI reporting is shown herein.

Referring to FIG. 14, where in the rank 4 codebook the codebook subset configuration made by higher layer signaling indicates config 1 (1405), one-bit $i_2$ is required, and where the codebook subset configuration indicates config 2, config 3, or config 4 (1410,1415), three-bit $i_2$ is required.

Where the rank is 4, and the codebook subset configuration is config 1 (1405), $i_2 \in \{0,1\}$ may be reported through the reporting mode but without codebook subsampling.

Since three-bit $i_2$ is required where the rank is 4 and the codebook subset configuration is config 2 (1410), codebook subsampling is applied to reduce the payload size necessary for reporting $i_2$ to two bits. Since the codebook subset configuration config 2 forms a beam group of four vertical and horizontal beams that are positioned adjacent each other (715 of FIG. 7), it is appropriate when the channel angular spread is relatively small. Unlike rank 2, rank 4 requires that direction terms orthogonal from each other be necessarily reported. Accordingly, upon performing codebook subsampling for $i_2$, it is needed to maintain all of the co-phasing terms and channel direction terms. In the example shown, the codebook subsampling rule for codebook subset configuration config 2 is defined to select one from $i_2 \in \{0,1,6,7\}$. With respect to the master codebook, the codebook subsampling rule corresponds to $i'_2 \in \{0,1,10,11\}$.

Since three-bit $i_2$ is required where the rank is 4 and the codebook subset configuration is config 3 (1410), codebook subsampling is applied to reduce the payload size necessary for reporting $i_2$ to two bits. Since the codebook subset configuration config 3 forms a beam group of four vertical and horizontal beams that are not positioned adjacent each other (720 of FIG. 7), it is appropriate when the channel angular spread is relatively large. Unlike rank 2, rank 4 requires that direction terms orthogonal from each other be necessarily reported. Accordingly, it is material to maintain the channel direction terms upon performing codebook subsampling for $i_2$. In the example shown, the codebook subsampling rule for codebook subset configuration config 3 is defined to select one from $i_2 \in \{0,2,4,6\}$. With respect to the master codebook, the codebook subsampling rule corresponds to $i'_2 \in \{4,6,8,10\}$. This is intended to quantize only the channel direction terms while omitting the co-phasing terms from $i_2$.

Since three-bit $i_2$ is required where the rank is 4 and the codebook subset configuration is config 4 (1415), codebook subsampling is applied to reduce the payload size necessary for reporting $i_2$ to two bits. Since the codebook subset configuration config 4 forms a beam group of four beams having the second direction term fixed (725 of FIG. 7), it is appropriate when the disparity in angular spread between the first direction and the second direction is relatively large. Unlike rank 2, rank 4 requires that direction terms orthogonal from each other be necessarily reported. Accordingly, it is material to maintain the channel direction terms upon performing codebook subsampling for $i_2$. In the example shown, the codebook subsampling rule for codebook subset configuration config 4 is defined to select one from $i_2 \in \{0,2,4,6\}$. With respect to the master codebook, the codebook subsampling rule corresponds to $i'_2 \in \{0,2,4,6\}$. This is intended to quantize only the channel direction terms while omitting the co-phasing terms from $i_2$.

In the following embodiment, generating channel status information based on codebook subset configuration 1 in the reporting mode permitting the multiple transmission of PMI is described.

As shown in FIGS. 12, 13, and 14, when the codebook subset configuration config 1 has been set, the maximum payload size for $i_2$ is two bits or less. The base station and the UE may agree to report channel status information based on the reporting mode without applying codebook subsampling based on ranks and based on config 1 regardless of the codebook subset configuration made by higher layer signaling.

Where the codebook subset configuration config 1 is set by the higher layer signaling of the base station, the UE determines to report channel status information based on the reporting mode without applying codebook subsampling based on ranks. Where the codebook subset configuration config 1 is made for the UE, the base station interprets the PMI of the channel status information reported from the UE without applying codebook subsampling based on ranks.

Particular embodiments of the present invention may be implemented as computer readable codes in a computer readable recording medium. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner Functional programs, codes, and code segments to attain various embodiments of the present invention may be readily interpreted by skilled programmers in the art to which the present invention pertains.

The apparatuses and methods according to embodiments of the present invention may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), DVDs, magnetic disks, magnetic tapes, or other optical or magnetic storage devices while retained in machine (e.g., computer)-readable storage media. The methods according to embodiments of the present invention may be implemented by a computer or a portable terminal including a controller and a memory, and the memory may be an exemplary machine-readable storage medium that may properly retain program(s) containing instructions for implementing the embodiments of the present invention.

Accordingly, the present invention encompasses a program containing codes for implementing the device or method set forth in the claims of this invention and a machine (e.g., computer)-readable storage medium storing the program. The program may be electronically transferred via any media such as communication signals transmitted through a wired or wireless connection and the present invention properly includes the equivalents thereof.

The apparatuses according to embodiments of the present invention may receive the program from a program providing device wiredly or wirelessly connected thereto and store the same. The program providing apparatus may include a memory for storing a program including instructions enabling a program processing apparatus to perform a method according to an embodiment of the present invention and data necessary for a method according to an embodiment of the present invention, a communication unit for performing wired or wireless communication with a graphic processing apparatus, and a controller transmitting the program to the graphic processing apparatus automatically or as requested by the graphic processing apparatus.

The embodiments herein are provided merely for better understanding of the present invention, and the present invention should not be limited thereto or thereby. The embodiments set forth herein are merely examples, and it will be apparent to one of ordinary skill in the art that various changes may be made thereto without departing from the scope of the present invention. The scope of the present invention should be defined by the following claims.

The invention claimed is:

1. A method for transmitting channel state information by a user equipment (UE) in a mobile communication system, the method comprising:
receiving, from a base station, a higher layer signaling message comprising information indicating a reporting mode for the channel state information and information related to a codebook subset configuration indicating subsampling a master codebook for use in reporting the channel state information;
determining whether to apply codebook subsampling to the master codebook based on the codebook subset configuration and the reporting mode, wherein the master codebook is defined as a set of precoding matrices shared by the UE and the base station;
upon determining to apply the codebook subsampling to the master codebook, generating a subsampled codebook by subsampling the master codebook and generating the channel state information comprising a first precoding matrix indicator (PMI) indicating a precoding matrix selected from the subsampled codebook;
when a plurality of feedback components are permitted to be simultaneously transmitted, further generating the channel state information further comprising a second PMI generated by assuming a particular codebook subset configuration which does not require subsampling and neglecting the codebook subset configuration made by the higher layer signaling; and
transmitting the channel state information to the base station.

2. The method of claim 1, wherein determining whether to apply the codebook subsampling comprises:
determining to apply the codebook subsampling to the master codebook in response to the reporting mode indicating that the first PMI may be transmitted along with another feedback component and in response to a PMI generated by the master codebook exceeding a maximum payload size for reporting the PMI generated by the master codebook in the reporting mode,
wherein the maximum payload size is determined based on the codebook subset configuration.

3. The method of claim 1, wherein transmitting the channel state information comprises transmitting the channel state information comprising the first PMI and another feedback component at a feedback timing to the base station.

4. The method of claim 1, wherein the codebook subsampling is performed based on a codebook subsampling rule defined by direction terms and co-phasing terms of beams comprised in a beam group formed by the codebook subset configuration, and
wherein the codebook subset configuration indicates a plurality of beam groups, each beam group comprising at least one beam having a vertical direction and a horizontal direction in a two-dimensional array of multiple antennas.

5. The method of claim 1, wherein the channel state information is transmitted to the base station through a physical uplink control channel (PUCCH) or a physical uplink shared channel (PUSCH).

6. The method of claim 1, wherein the master codebook is determined by a number of antenna ports for a first direction and a second direction and oversampling factors for the first direction and the second direction.

7. A method for receiving channel state information by a base station in a mobile communication system, the method comprising:
transmitting, to a user equipment (UE), a higher layer signaling message comprising information indicating a reporting mode for the channel state information and information related to a codebook subset configuration indicating subsampling a master codebook for use in reporting the channel state information;
receiving the channel state information comprising a precoding matrix indicator (PMI) from the UE;
determining whether codebook subsampling has been applied to the master codebook based on the reporting mode and the codebook subset configuration, wherein the master codebook is defined as a set of precoding matrices shared by the UE and the base station;
upon determining that the codebook subsampling has been applied, generating a subsampled codebook by subsampling the master codebook and identifying a precoding matrix indicated by the PMI based on the subsampled codebook; and
when a plurality of feedback components are permitted to be simultaneously transmitted, determining that the PMI was generated assuming a particular codebook subset configuration which does not require subsampling and that the codebook subset configuration made by the higher layer signaling was neglected by the UE.

8. The method of claim 7, wherein determining whether the codebook subsampling has been applied for the PMI comprises:
determining to apply the codebook subsampling to the master codebook in response to the reporting mode indicating that the PMI may be transmitted along with another feedback component and in response to a PMI generated by the master codebook exceeding a maximum payload size for reporting the PMI generated by the master codebook in the reporting mode,
wherein the maximum payload size is determined based on the codebook subset configuration.

9. The method of claim 7, wherein the codebook subsampling is performed based on a codebook subsampling rule defined by direction terms and co-phasing terms of beams comprised in a beam group formed by the codebook subset configuration, and
wherein the codebook subset configuration indicates a plurality of beam groups, each beam group comprising at least one beam having a vertical direction and a horizontal direction in a two-dimensional array of multiple antennas.

10. The method of claim 7, wherein the master codebook is determined by a number of antenna ports for a first direction and a second direction and oversampling factors for the first direction and the second direction.

11. A device in a user equipment (UE) for transmitting channel state information in a mobile communication system, the device comprising:
a transceiver; and
a controller coupled with the transceiver and configured to:
receive a higher layer signaling message comprising information indicating a reporting mode for the channel state information and information related to a codebook subset configuration indicating subsampling a master codebook for use in reporting the channel state information;
determine whether to apply codebook subsampling to the master codebook based on the codebook subset configuration and the reporting mode, wherein the master codebook is defined as a set of precoding matrices shared by the UE and a base station;
upon determining to apply the codebook subsampling to the master codebook, generate a subsampled codebook by subsampling the master codebook and generate the channel state information comprising a first precoding matrix indicator (PMI) indicating a precoding matrix selected from the subsampled codebook;
when a plurality of feedback components are permitted to be simultaneously transmitted, further generate the channel state information further comprising a second PMI generated by assuming a particular codebook subset configuration which does not require subsampling and neglecting the codebook subset configuration made by the higher layer signaling; and
transmit the channel state information to the base station.

12. The device of claim 11, wherein the controller is further configured to determine to apply the codebook subsampling to the master codebook in response to the reporting mode indicating that the first PMI may be transmitted along with another feedback component and in response to a PMI generated by the master codebook exceeding a maximum payload size for reporting the PMI generated by the master codebook in the reporting mode,
wherein the maximum payload size is determined based on the codebook subset configuration.

13. The device of claim 11, wherein the controller is further configured to transmit the channel state information comprising the first PMI and another feedback component at a feedback timing to the base station.

14. The device of claim 11, wherein the codebook subsampling is performed based on a codebook subsampling rule defined by direction terms and co-phasing terms of beams comprised in a beam group formed by the codebook subset configuration, and
wherein the codebook subset configuration indicates a plurality of beam groups, each beam group comprising at least one beam having a vertical direction and a horizontal direction in a two-dimensional array of multiple antennas.

15. The device of claim 11, wherein the channel state information is transmitted to the base station through a physical uplink control channel (PUCCH) or a physical uplink shared channel (PUSCH).

16. The device of claim 11, wherein the master codebook is determined by a number of antenna ports for a first direction and a second direction and oversampling factors for the first direction and the second direction.

17. A device in a base station for receiving channel state information in a mobile communication system, the device comprising:
a transceiver; and
a controller coupled with the transceiver and configured to:
transmit, to a user equipment (UE), a higher layer signaling message comprising information indicating a reporting mode for the channel state information and information related to a codebook subset configuration indicating subsampling a master codebook for use in reporting the channel state information;
receive the channel state information comprising a precoding matrix indicator (PMI) from the UE;
determine whether codebook subsampling has been applied to the master codebook based on the reporting mode and the codebook subset configuration, wherein the master codebook is defined as a set of precoding matrices shared by the UE and the base station;
upon determining that the codebook subsampling has been applied, generate a subsampled codebook by subsampling the master codebook and identifying a precoding matrix indicated by the PMI based on the subsampled codebook; and
when a plurality of feedback components are permitted to be simultaneously transmitted, determine that the PMI was generated assuming a particular codebook subset configuration which does not require subsampling and that the codebook subset configuration made by the higher layer signaling was neglected by the UE.

18. The device of claim 17, wherein the controller is further configured to determine to apply the codebook subsampling to the master codebook in response to the reporting mode indicating that the PMI may be transmitted along with another feedback component and in response to a PMI generated by the master codebook exceeding a maximum payload size for reporting the PMI generated by the master codebook in the reporting mode,
wherein the maximum payload size is determined based on the codebook subset configuration.

19. The device of claim 17, wherein the codebook subsampling is performed based on a codebook subsampling rule defined by direction terms and co-phasing terms of beams comprised in a beam group formed by the codebook subset configuration, and
wherein the codebook subset configuration indicates a plurality of beam groups, each beam group comprising at least one beam having a vertical direction and a horizontal direction in a two-dimensional array of multiple antennas.

20. The device of claim 17, wherein the master codebook is determined by a number of antenna ports for a first direction and a second direction and oversampling factors for the first direction and the second direction.

* * * * *